United States Patent
Wu

(10) Patent No.: US 12,162,052 B2
(45) Date of Patent: Dec. 10, 2024

(54) FIBER RAW MATERIALS PROCESSING SYSTEM AND OPERATING METHOD THEREOF

(71) Applicant: YI CHUN GREEN TECHNOLOGY CO., LTD., Taoyuan (TW)

(72) Inventor: Pei-Jen Wu, Taoyuan (TW)

(73) Assignee: YI CHUN GREEN TECHNOLOGY CO., LTD., Taoyuan (TW)

( * ) Notice: Subject to any disclaimer, the term of this patent is extended or adjusted under 35 U.S.C. 154(b) by 273 days.

(21) Appl. No.: 17/947,091

(22) Filed: Sep. 17, 2022

(65) Prior Publication Data

US 2023/0089779 A1 Mar. 23, 2023

Related U.S. Application Data

(60) Provisional application No. 63/272,164, filed on Oct. 26, 2021, provisional application No. 63/272,159, (Continued)

(51) Int. Cl.
*B02C 19/22* (2006.01)
*B01J 20/34* (2006.01)
*B02C 23/14* (2006.01)
*B02C 23/20* (2006.01)
*B02C 23/22* (2006.01)
(Continued)

(52) U.S. Cl.
CPC ............. *B09B 3/35* (2022.01); *B01J 20/3475* (2013.01); *B02C 19/22* (2013.01); *B02C 23/14* (2013.01); *B02C 23/20* (2013.01); *B02C 23/22* (2013.01); *B02C 23/36* (2013.01); *B03B 9/06* (2013.01); *B09B 3/38* (2022.01); *D21B 1/026* (2013.01); *D21B 1/061* (2013.01); *B02C 2023/165* (2013.01); *B09B 2101/67* (2022.01)

(58) Field of Classification Search
CPC ......... B02C 19/22; B02C 23/20; B02C 23/14; B02C 23/22; B02C 23/36; D21B 1/061; D21B 1/026
See application file for complete search history.

(56) References Cited

U.S. PATENT DOCUMENTS 5,580,446 A 12/1996 Markham
5,665,205 A 9/1997 Srivasta et al.
(Continued)

FOREIGN PATENT DOCUMENTS

| CN | 101096431 B | 8/2010 |
| CN | 111979814 A | * 11/2020 |

(Continued)

*Primary Examiner* — Faye Francis
(74) *Attorney, Agent, or Firm* — Cheng-Ju Chiang

(57) ABSTRACT

The present invention provides a fiber raw material processing system and its operation method. The fiber raw material processing system is composed of a cutting module, a bulk pulping module, a salt slurry processing module, a pressure screen, a separation module, an inclined screen module, and an extrusion module and a recycling module, which are connected in series. The operating method of the fiber raw material processing system is to process absorptive articles such as diapers or sanitary napkins, etc., which are retained and made into fluff fiber raw materials through the purification and separation steps performed by the modules of the fiber raw material processing system.

20 Claims, 4 Drawing Sheets

Related U.S. Application Data filed on Oct. 26, 2021, provisional application No. 63/245,796, filed on Sep. 17, 2021.

(51) Int. Cl.

| | | |
|---|---|---|
| *B02C 23/36* | (2006.01) | |
| *B03B 9/06* | (2006.01) | |
| *B09B 3/35* | (2022.01) | |
| *B09B 3/38* | (2022.01) | |
| *D21B 1/02* | (2006.01) | |
| *D21B 1/06* | (2006.01) | |
| B02C 23/16 | (2006.01) | |
| B09B 101/67 | (2022.01) | |

(56) References Cited

U.S. PATENT DOCUMENTS

| | | | |
|---|---|---|---|
| 5,766,448 A | 6/1998 | Markham | |
| 11,673,172 B2 * | 6/2023 | Konishi | ................ B03B 9/061 |
| | | | 162/5 |
| 2004/0140069 A1 | 7/2004 | Selin | |
| 2012/0214979 A1 | 8/2012 | Heiskanen et al. | |
| 2020/0002890 A1 | 1/2020 | Jennings | |
| 2020/0346261 A1 * | 11/2020 | Konishi | ................ B02C 23/36 |
| 2021/0039071 A1 * | 2/2021 | Yoshinaga | ......... B01J 20/28016 |

FOREIGN PATENT DOCUMENTS

| | | | | | |
|---|---|---|---|---|---|
| CN | 212247650 U | * | 12/2020 | | |
| CN | 112941948 A | * | 6/2021 | ............... | D21B 1/32 |
| CN | 113802401 A | * | 12/2021 | | |
| CN | 216615297 U | * | 5/2022 | | |
| WO | WO-2019087486 A1 | * | 5/2019 | ............. | A61F 13/15 |

* cited by examiner

FIBER RAW MATERIALS PROCESSING SYSTEM AND OPERATING METHOD THEREOF

TECHNICAL FIELD

The present invention is related to a fiber raw material processing system and operating method thereof. Specifically, the present invention is a waste treatment system and method which are used for processing different kinds of absorptive articles. The system of the present invention may decompose, purify and recycle absorptive articles, therefore to effectively reuse it.

BACKGROUND OF RELATED ARTS

The commercial absorptive articles such as the diaper, sanitary napkin are used in the modern life. Users of all generations may be possible to use the absorptive articles according to different needs. The development of consumption or living habits of people, and the industrial manufacturing capacity develops so on. The absorptive article has shown the advantages such as the cheap price, light weight, cleanliness, hygiene, and disposal after use.

However, the absorptive article may be advantageous of use, the absorptive article usually comprises skin-friendly non-woven fabric which is used for touching the skin, an absorptive layer which shows great ability of liquid absorption, a liquid-proof layer which is made from the liquid-proof plastic and the urination or defecation wastes which are wrapped in the absorptive article. These chemical contents which is absorbent may increase the complexity, cost and burden of processing the absorptive waste.

That is, the fluff pulp is an important content of the absorptive article. The fluff pulp plays an important role of increasing the ideal characteristics of the absorptive article such as the absorption, rewet, diffusion, compressing and softness abilities. The raw material of the fluff pulp is the coniferous wood. The coniferous wood is characterized in that it is strong and has longer fiber. These characteristics greatly determined the ability of use per se.

In addition, due to the density of the liquid-absorbing layer of sanitary products, it is an important indicator in production. Low density can increase the rate of liquid absorption and total absorption amount but may reduce the rate of liquid diffusion and increases evapotranspiration. However, high density helps the liquid to spread. Therefore, in the production process, if the multi-layer liquid absorbing layer is designed to have a configuration of large void material on top and small void material on the bottom, it can effectively diffuse and absorb liquid to the small void material and reduce back seepage. Due to special requirements for products per se, sanitary products are required to include a fluffy liquid absorbing layer, a diffusion layer and a high-density liquid storage layer at the same time. In this multifunctional liquid-absorbing composite material, the absorbent polymer will absorb a large amount of water in a humid environment, resulting in a clogged viscous substance, which makes the purification and separation of the material be difficult. There are certain difficulties in the waste disposal procedure. The decomposition process requires a certain precision. Accordingly, experts in the field need to develop a processing system for decomposing, separating, and recycling the fiber raw material used exclusively for the absorbent hygiene product.

SUMMARY

To solve the problems mentioned in the prior arts, the present invention discloses a fiber raw material processing system and operating method thereof. The consumed absorbent hygiene products may be decomposed and recycled by the system of the present invention. This system uses specific methods of each module, therefore to separate the fiber raw material therein. The raw materials may be reclaimed and being another reusable new product, realizing the re-use of waste.

The present invention provides a fiber raw material processing system which comprises a cutting module, a bulk pulping module, a salt slurry processing module, a pressure screen, a separation module, an inclined screening module, an extruder and a recycling module. The bulk pulping module comprises at least one spoiler, a first rotor and at least two blades. The pressure screen comprises a second rotor, a first filtration pore and a waste outlet. The inclined screening module comprises a slope, a second filtration pore and a liquid outlet. The recycling module is connected with the extruder, the inclined screening module and the bulk pulping module simultaneously, for receiving the liquid which are filtered from the extruder, the inclined screening module, being re-processed by the bulk pulping module.

The present invention further provides an operating method of fiber raw material processing system which comprises the following steps: the step (A) is to provide the fiber raw material processing system mentioned above. The step (B) is to put an absorptive article into the cutting module for cutting. The step (C) is to transfer the absorptive article which has been cut to the bulk pulping module, and the bulk pulping module breaks and separates the absorptive article via a centrifugal force breaking separation, remaining an absorptive recycled material. The (D) is to transfer the absorptive recycled material to the salt slurry processing module, separating a primary fiber material. The step (E) filters the primary fiber material with the pressure screen, and the pressure screen filters out a secondary fiber material and an impurity. The step (F) is to filter the secondary fiber material with the separation module, and the separation module removes a waste of the secondary fiber material via centrifugal force, producing a fluff fiber raw material precursor. In step (G), the fluff fiber raw material precursor is transferred to the inclined screening module for filtration, remaining a primary fluff fiber raw material product. The step (H) is that the primary fluff fiber raw material product is transferred to the extruder for squeezing and dehydrating, forming a fiber raw material.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical effects of the present invention and to implement it in accordance with the contents of the specification, a preferred embodiment as shown in the figure is further described in detail as follows.

Figure 1:
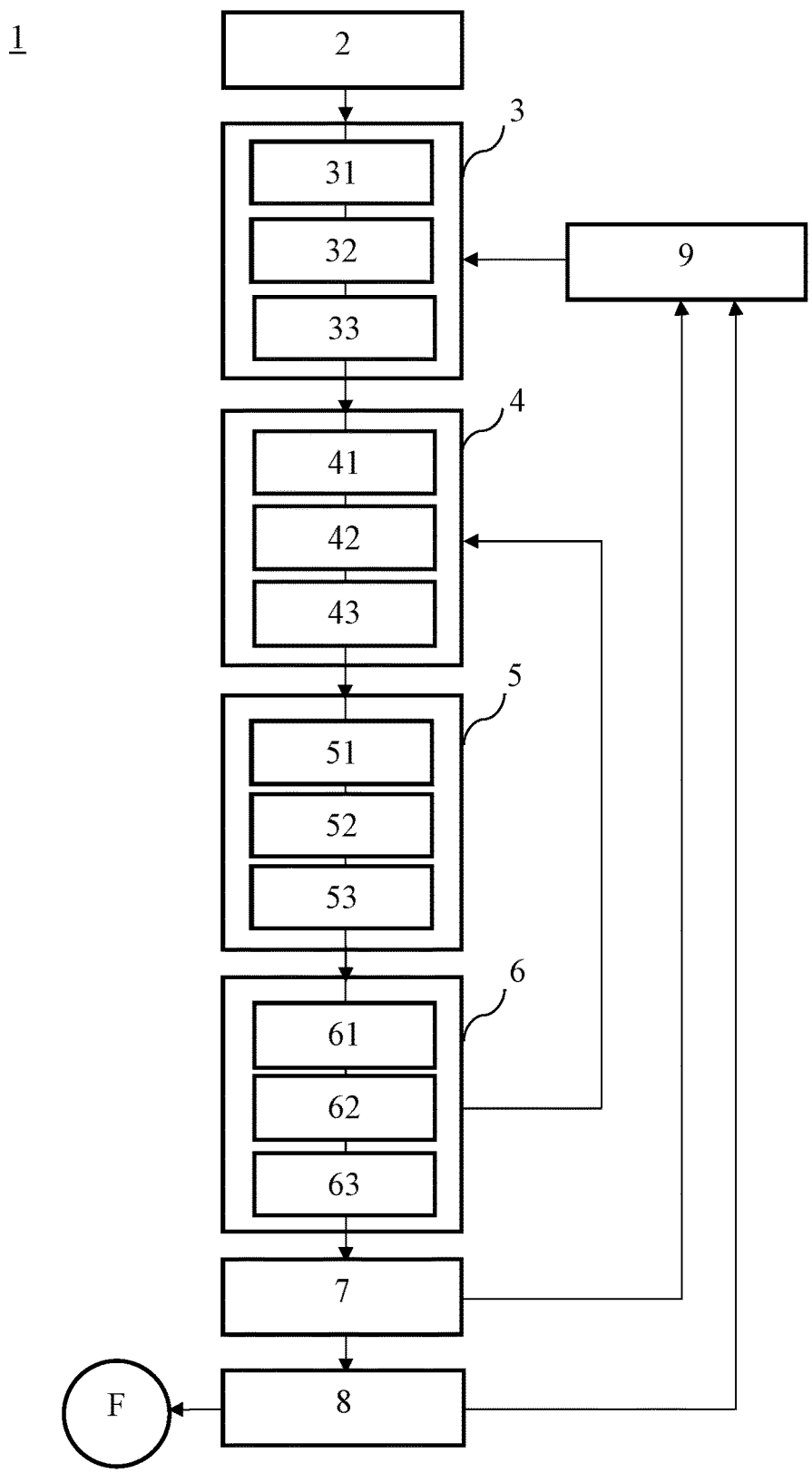
FIG. 1 is the schematic diagram of the embodiment of the fiber raw material processing system of the present invention.

Please refer to FIG. 1, FIG. 1 is the schematic diagram of the embodiment of the fiber raw material processing system of the present invention. The preferable embodiment of the present invention is a fiber raw material processing system 1 recited in FIG. 1. The fiber raw material processing system 1 comprises cutting module 2, bulk pulping module 3, salt slurry processing module 4, pressure screen 5, separation module 6, inclined screening module 7, extruder 8 and recycling module 9 connected in series therein. The bulk pulping module 3 comprises spoilers 31, first rotor 32 and blades 33. The pressure screen 5 comprises second rotor 51, first filtration pore 52 and waste outlet 53. The inclined screening module 7 comprises a slope, a second filtration pore and a liquid outlet. Moreover, the first filtration pore 52 is spindle filtration pore. The second filtration pore is constructed by the pores which have different diameters.

The recycling module 9 is connected with the extruder 8, the inclined screening module 7 and the bulk pulping module 3 simultaneously. The recycling module 9 is used for recycling the filtered liquid from the extruder 8, and the inclined screening module 7, therefore to transfer back to the bulk pulping module 3 for re-process or re-use. The main function of this embodiment is to systematically carry out a continuous process for the used absorbent hygiene products, and optimize the recycling capacity and recycling processing power according to the special method of each module to effectively decompose, separation and recycling, especially for the particularity of fiber raw material F, it is separated for achieving the effect of effective reuse of waste.

First, the fiber raw material processing system 1 is operated in the beginning of cutting module 2, processing the original waste. The cutting module 2 is connected with the bulk pulping module 3. In this embodiment, the cutting module 2 is used for cutting, slashing, breaking and separating the materials contained by the absorptive article. This process makes the content of the absorptive article be easier to be separated in the bulk pulping module 3, increasing the pulping efficiency of the bulk pulping module 3. The bulk pulping module 3 is connected with the cutting module 2. The reusable waste which has been cut by the cutting module 2 may be transferred to the bulk pulping module 3, the disc blade having high torque thus to perform the effect of centrifugal force breaking separation. The fluff fiber will be separated without clogging and transferred to the following processes.

Figure 2:
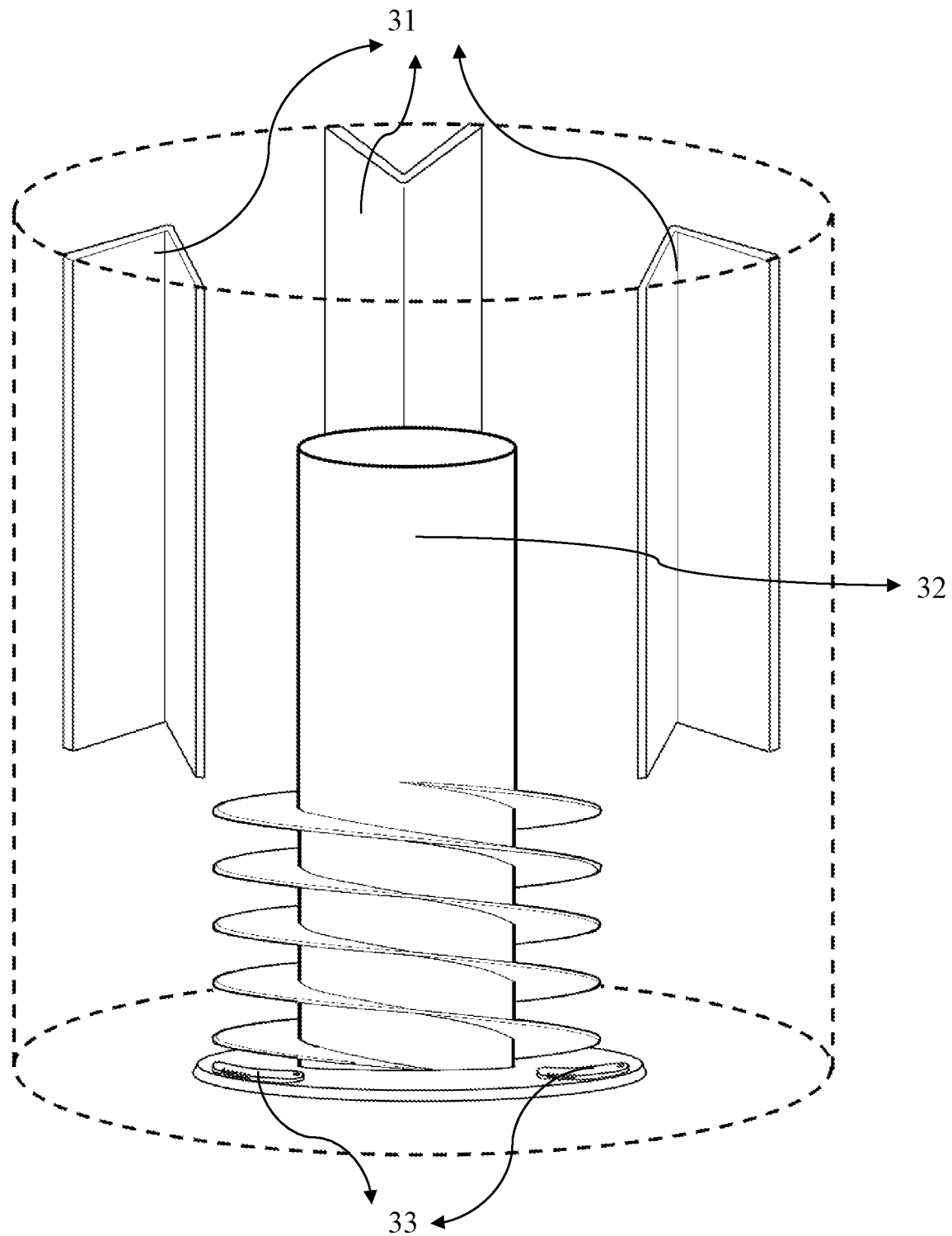
FIG. 2 is the schematic diagram of the embodiment of the bulk pulping module of the fiber raw material processing system of the present invention.

The inner structure of the bulk pulping module 3 is illustrated in FIG. 2. Please refer to FIG. 2, as shown in FIG. 2, the bulk pulping module 3 of the present embodiment comprises spoiler 31, rotor 32 and blades 33. The spoiler 31 may be single or multiple board or plate structure. The number of the spoiler 31 configured in the bulk pulping module 3 may create vortex when the liquid of the bulk pulping module 3 is rotating. Hence, the aforementioned material may be led to the blades 33 which are configured on the bottom of the bulk pulping module 3 via the undercurrent created by the aforementioned vortex. On the other hand, the blades 33 prevents the round clogging of the separated material.

In current embodiment, the blades 33 may be spiral blades or disc blade, and the number per se may be multiple. For instance, the number of the blades 33 shown in FIG. 2 are two, and the blades 33 are configured on the bottom of the bulk pulping module 3 symmetrically. Moreover, when the spoiler 31 of the present embodiment is designed to be constructed by multiple boards. The multiple boards are independently and symmetrically configured on the inner wall of the bulk pulping module 3 with certain distance from the center of the bulk pulping module 3. Therefore, the bulk pulping module 3 may keep balance during the rotation per se. Specifically, in prior arts, chopper or shredder may break or cut the absorptive article and create the material leakage therein. However, the soft absorptive article may be seriously broken into small pieces which is difficult for the separation work thereafter. Therefore, the bulk pulping module 3 of the present embodiment further configures a rotor 32 and an inverter motor which is connected with the rotor 32. The rotor 32 may be the columnar rotor, which may use the liquid force to stir and separate the absorptive article, making the leakage of the fluff pulp therein. On the other hand, the present embodiment may monitor the concentration of the pulp, make sure the best efficiency of separation and bulk pulping.

Otherwise, in the present embodiment, the bulk pulping module 3 further comprises a gravity level gauge. The gravity level gauge may detect the liquid level therein via the weight of liquid, therefore to control the amount of the waste. In other words, when the liquid level of the bulk pulping module 3 has satisfied the pre-set value, the system may automatically feed the waste therein; the rotor 32 thus be able to rotate under the pre-set rotational speed and period of time. After the rotor 32 has finish the task per se, the liquid may be added to the aforementioned pre-set value again. At the same time, the plastic piece which has been broken or separated from the absorptive article will be suspended on the surface of liquid. On the other hand, the other matters such as the fluff pulp and the primary liquid-absorbing material may be settled down to the bottom of the bulk pulping module 3. Specifically, to prevent the mentioned plastic piece forms clogging and interferes the purification steps thereon, an outlet may be allowed to be configured on the bulk pulping module 3 for removing the plastic piece from the bulk pulping module 3.

The absorptive recycled material processed by bulk pulping module 3 may be transferred to the salt slurry processing module 4 in next step. The salt slurry processing module 4 of the present embodiment is connected with the bulk pulping module 3. In this embodiment, the salt slurry processing module 4 creates different layers via different densities of the broken absorptive article which has been processed by the bulk pulping module 3, for filtering. Specifically, the salt slurry processing module 4 of the present embodiment receives the broken absorptive recycled material from the bulk pulping module 3. The absorptive recycled material represents the characteristics of difference of liquid-absorbing ability and density. Therefore, the absorptive recycled material will be settled down in the salt slurry processing module 4 due to the density per se.

Figure 3:
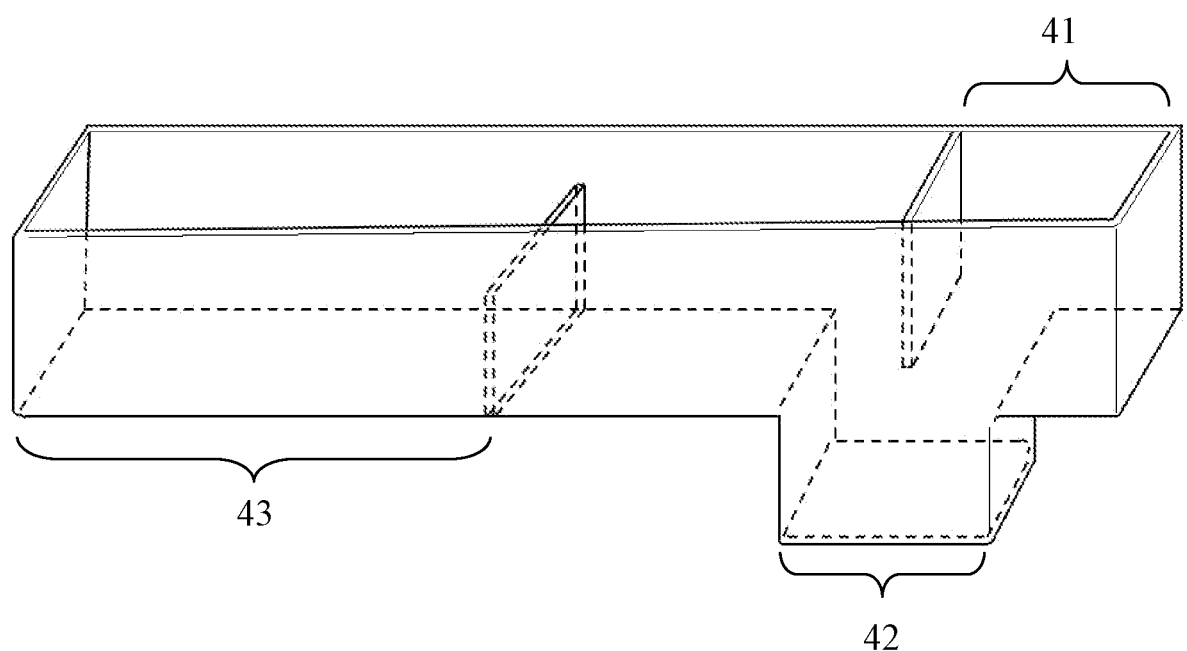
FIG. 3 is the schematic diagram of the embodiment of the salt slurry processing module of the fiber raw material processing system of the present invention.

Furthermore, the salt slurry processing module 4 of the present embodiment further comprises buffering tank 41, settlement tank 42 and slurry storage tank 43. The buffering tank 41 is connected with the bulk pulping module 3 for receiving the absorptive recycled material. The settlement tank 42 is connected with the buffering tank 41 for separating the at least one absorbent polymer having higher density of the absorptive recycled material such as the sodium polyacrylate. The slurry storage tank 43 is connected with the settlement tank 42 for receiving the primary fiber material having lower density of the absorptive recycled material. In other words, the salt slurry processing module 4 of the present invention may separate the absorbent polymer and the fluff pulp which are absorbent. Due to the specific gravity of the fluff pulp is 0.98, and the specific gravity of the absorbent polymer ranges from 1.4 to 1.8. The absorbent polymer having greater specific gravity will be retained in the bottom layer of the settlement tank 42; the primary fiber material having smaller specific gravity will be led to the slurry storage tank 43 via fluid liquid as shown in FIG. 3. On the other hand, the slurry storage tank 43 may further comprise a concentration gauge, which is used for detecting the concentration of fluff pulp. Specifically, the salt slurry processing module 4 may control the input pressure due to the actual input amount of absorptive article for controlling the flow rate of the absorptive recycled material in the salt slurry processing module 4.

After the separation of the fluff pulp and absorbent polymer in the salt slurry processing module 4, the fluff pulp may be transferred to the pressure screen 5 via the slurry storage tank 43 in next procedure. In the present embodiment, the pressure screen 5 comprises second rotor 51, first filtration pore 52, waste outlet 53 or combinations thereof. The second rotor 51 is designed to have different and specific structure from the first rotor 32. The first filtration pore 52 is designed as spindle filtration pores, therefore to filter out the unessential impurity form the fluff pulp. For instance, the wire, rope or remaining plastic piece in preceding procedures of diaper. In other words, the diameter of the pore may be designed to be a sieve. The mesh of the pore may range from 10 to 30 mm, for separating the plastic piece such as PE or PP. Moreover, the unessential impurity will be removed via the waste outlet 53. On the other hand, the outlet of the pressure screen 5 has a pre-set pressure value. The pressure may be created by a stainless-steel cap which may change the weight per se. That is, all mechanism which may create pressure to the fluff pulp inside first filtration pore 52 is acceptable.

After the filtration of pressure screen 5, the filtered fluff pulp is transferred to the separation module 6, and the centrifugal may be used for further purifying and separating the fluff pulp. The separation module 6 comprises a first centrifugal machine 61, a dilution tank 62, a second centrifugal machine 63 or the combinations thereof. In current step, the double centrifugation may make sure that no liquid-absorbing salt will be remained in the fluff pulp. The first centrifugal machine 61 and second centrifugal machine 63 may be the cyclone separation units connected in series. The two-step centrifugation of the cyclone separation units connected in series may significantly purify the fluff pulp. The residues in this step (not the fluff pulp) will be transferred to the salt slurry processing module 4 for recycling the liquid-absorbing salt. The number of the centrifugal machine of the separation module 6 may be determined by users, the present invention is not limited thereto.

The preceding procedures had accomplished the filtration of plastic piece or the liquid-absorbing salt for the fluff pulp. The further purification will be proceeded to the inclined screening module 7. In the present embodiment, the inclined screening module 7 comprised a slope, a second filtration pore, a liquid outlet or the combinations thereof. The purpose of the slope is to make the fluff pulp slides down on it via the gravity. The second filtration pore configured on the slope may perform different filtration effects during this procedure, effectively removing the remaining liquid or impurities therein. The second filtration pore is different from the aforementioned first filtration pore 52. The second filtration pore may be constructed by the pores which have different sizes. Specifically, the mesh of the pores is ranged from 0.325 to 0.725 mm. The liquid filtered out by the second filtration pore will be recycled to the recycling module 9 via the liquid outlet.

At last, to make sure that there is nearly no liquid contained by the final product fiber raw material F, the most of liquid should be filtered and removed in the inclined screening module 7. On the other hand, the fluff pulp is transferred to the extruder 8. The outlet of the extruder 8 may configure a stainless-steel cap which may change the weight per se. The stainless-steel cap creates a pressure inside the extruder 8. The pressure may range from 1 kg to 8 kg, the best is 4 kg, for squeezing the remaining liquid therein. In other words, extruder 8 may compress the fluff pulp again for removing the remaining liquid in the fluff pulp. The removed liquid is also recycled by the recycling module 9, too.

In the present embodiment, the recycling module 9 is used for recycling the waste water or excess liquid from inclined screening module 7 and extruder 8 or the excess liquid of bulk pulping module 3. The recycling module 9 may be the processing tank/barrel which contains a plurality of carriers. The carriers may be porous material such as zeolite or activated carbon, filter materials or scaffolds. The carrier is used for carrying at least one decomposing microorganisms. That is, the recycling module 9 may receive the processed liquid from absorptive article, and the processed liquid comprises the human body wastes of urination or defecation carried or absorbed by the absorptive article.

Therefore, the decomposing microorganisms is used for decomposing the organic or inorganic wastes in the recycled liquid, thus to purify the recycled liquid. The continuous liquid recycling circulation mechanism may gradually purify the recycled liquid which enters bulk pulping module 3. Moreover, the work efficiency of the bulk pulping module 3 may be significantly increased, too.

The present invention further provides an operating method of fiber raw material processing system 1. Please refer to FIG. 4., the operating method of the fiber raw material processing system 1 comprises the following steps. In step (A), a fiber raw material processing system 1 mentioned above is provided. The step (B) is to put an absorptive article into the cutting module 2 for cutting. In step (C), the absorptive article which has been cut will be transferred to a bulk pulping module 3, and the bulk pulping module 3 breaks and separates the absorptive article via a centrifugal force breaking separation, remaining an absorptive recycled material. The step (D) transfers the absorptive recycled material to the salt slurry processing module 4, separating a primary fiber material. Thereafter, the step (E) filters the primary fiber material with the pressure screen 5, and the pressure screen 5 filters out a secondary fiber material and an impurity. In step (F), the secondary fiber material is filtered by the separation module 6, and the separation module 6 removes a waste of the secondary fiber material via centrifugal force, producing a fluff fiber raw material precursor. The step (G) is that the fluff fiber raw material precursor is transferred to the inclined screening module 7 for filtration, remaining a primary fluff fiber raw material product. At last, the step (H) is that the primary fluff fiber raw material product is transferred to the extruder 8 for squeezing and dehydrating, forming a fiber raw material F.

Figure 4:
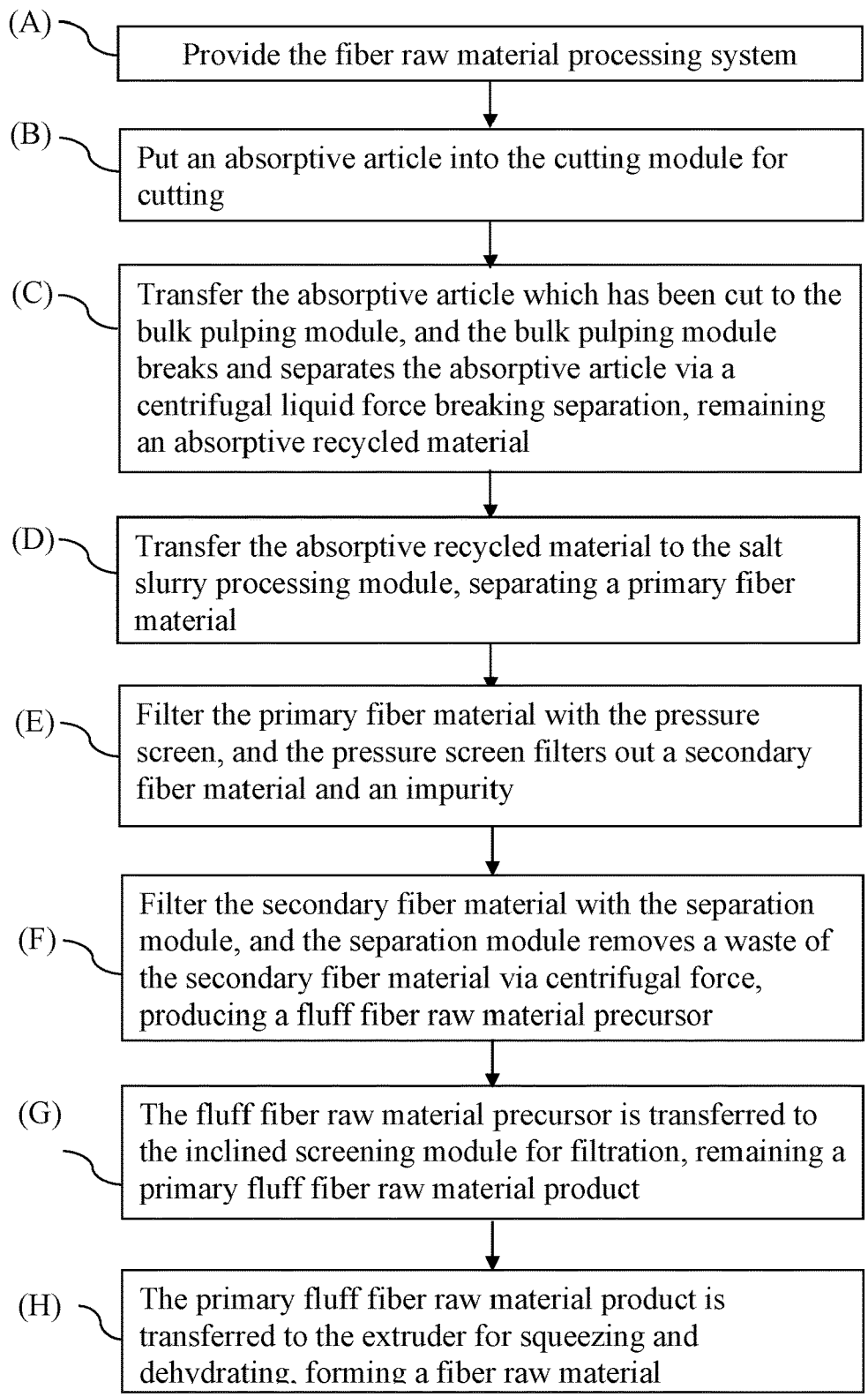
FIG. 4 is the flow chart of the operating method of the fiber raw material processing system of the present invention.

Please refer to FIG. 4, in step (A), the fiber raw material processing system 1 illustrated in FIG. 1 has been provided. Next, the absorptive article which is put into the fiber raw material processing system 1 mentioned in step (B) may be diaper, nursing pads, sanitary pads or other personal hygiene products, the present invention is not limited thereto. The absorptive article mainly comprises the fluff fiber, absorbent polymer and plastic thereof. The fiber raw material processing system 1 may be able to separate and purify the fluff fiber. First of all, the cutting module 2 of the present embodiment may cut the absorptive article such as the diaper or sanitary pads, and the inner content of the absorptive article will be easier to be separated in the post procedures.

Please refer to FIG. 4, the step (C) is to transfer the absorptive article which has been cut to the bulk pulping module 3, and the bulk pulping module 3 breaks and separates the absorptive article via a centrifugal force breaking separation, remaining an absorptive recycled material and proceeding to step (D). The absorptive article which has been cut will be transferred via the overhead crane or other methods, until it enters the bulk pulping module 3. On the other hand, the centrifugal force breaking separation is performed by the rotation of disc blade having high torque. That is, the fluff fiber will be effectively separated and forwarding to the next procedure. In this step, the bulk pulping module 3 may remove the primary plastic, however remain the absorptive recycled material simultaneously. Specifically, the primary plastic is the liquid-proof material of the absorptive article such as the outer water-proof layer of diaper. Thus, the absorptive recycled material may comprise fluff fiber, absorbent polymer or the combination thereof. In other words, the absorptive article which may be removed the water-proof material should be comprised by the scope of the present invention. The centrifugal force breaking separation may automatically control the rotational speed, period of time or liquid level in bulk pulping module 3 when the bulk pulping module 3 is working. For instance, the "intermittent discharge" of pulp is used herein, preventing the continuous discharge clogs the pulp outlet. The primary plastic such as the plastic piece will be removed via the plastic outlet configured on the bottom of the bulk pulping module 3. The bulk pulping module 3 further comprises first rotor 32, which stands on the center of the bulk pulping module 3. The purpose of the first rotor 32 is to prevent the clogging of the absorptive article during the centrifugal force breaking separation. The bulk pulping module 3 further comprises at least one spoiler 31. When the centrifugal force breaking separation is proceeding, the vortex therein may create undercurrent of liquid, therefore the waste therein may contact the blades 33 configured in the bottom of the bulk pulping module 3 directly, accelerating the efficiency of the absorptive article centrifugal force breaking separation.

In step (D), the absorptive recycled material is transferred to a salt slurry processing module 4 for separating a primary fiber material. Specifically, the primary fiber material is the purification result of this step. This step is to firstly separate the absorbent polymer contained by the absorptive recycled material such as the liquid-absorbing salt. The absorptive recycled material is led to the first buffering area of the salt slurry processing module 4, the buffering tank 41. The buffering tank 41 performs the buffering effect from the bulk pulping module 3, the absorptive recycled material may buffering tank 41 temporarily stop and suspended therein. Hence, the impurities may be sustained therein, too. The absorptive recycled material is settled down in the settlement tank 42 which is further comprised by the salt slurry processing module 4 via gravity. That is, this mechanism may separate the absorbent polymer which has higher density of the absorptive recycled material, excepting the primary fiber material. The absorbent polymer will be retained in the settlement tank 42 and used for the other process thereafter. The salt slurry processing module 4 further comprises slurry storage tank 43. The slurry storage tank 43 may retain the primary fiber material having low density and is led by the fluid liquid of settlement tank 42, therefore to proceeds to the step (E).

After the separation of the primary fiber material and the absorbent polymer in the abovementioned salt slurry processing module 4, the step (E) is that the primary fiber material will passes through the pressure screen 5. The pressure screen 5 may be able to separate the secondary fiber material and removing the impurity. The primary fiber material is processed by the second rotor 51 and the first filtration pore 52 of the pressure screen 5, the secondary fiber material remains. The primary fiber material may remove the impurity again via the waste outlet 53 of pressure screen 5. That is, the purpose of the pressure screen 5 is for removing the impurity contained by the primary fiber material. The impurity may be the liquid-absorbing salt or the other matters which has not been removed in the preceding steps.

Due to the limited effect of the filtering method via gravity, the (F) is to make the secondary fiber material pass through the separation module 6. The centrifugal force may remove the waste contained in the secondary fiber material, purifying the fluff fiber raw material precursor. In this embodiment, the "fluff fiber raw material precursor" is the fluff fiber without waste. The waste mentioned here may be the liquid-absorbing salt or the other matters which are not fluff fiber. The separation module 6 further comprises first centrifugal machine 61, dilution tank 62, second centrifugal machine 63 or the combinations thereof. In this embodiment, the double centrifugation may make sure that there is no remaining liquid-absorbing salt in the secondary fiber material. After the first centrifugation, the dilution tank 62 will add the liquid, therefore to decrease the concentration and increase the volume. This mechanism may help for the separation of the remained liquid-absorbing salt. As illustrated by the present embodiment, the times of the centrifugation may be adjusted by the users or depend on the needs. On the other hand, the number of the dilution tank 62 should be adjusted thereafter. The separation module 6 is further connected with the salt slurry processing module 4. Therefore, the waste such as the separated absorbent polymer in this step may be transferred back to the salt slurry processing module 4.

Finally, in steps (G) and (H), the main purpose of these steps is to dry and dehydrate the aforementioned fluff fiber raw material precursor. The fluff fiber raw material precursor is transferred to the inclined screening module 7, forming the primary fluff fiber raw material product. The primary fluff fiber raw material product is transferred to the extruder 8 and then be squeezed, forming the fiber raw material F. The step (G) is that the fluff fiber raw material precursor is filtered by the slope and second filtration pore of inclined screening module 7. The second filtration pore is constructed by the pores having different diameters. The diameters of the aforementioned pores may be adjusted to the suitable size due to the users or needs. The second filtration pore is configured on the slope, therefore to filter the waste water of the fluff fiber raw material precursor via gravity. On the other hand, the liquid filtered in the steps (G) and (H) will be recycled by the recycling module 9. Specifically, the recycled waste water is mainly form the liquid outlet of inclined screening module 7 in step (G) and the squeezing of extruder 8 in step (H). The recycled liquid may be further transferred to the bulk pulping module 3 and be helpful for repeating steps (C) to (H).

To sum up, the purpose of the present invention is to provide a fiber raw material processing system 1 and the operating method thereof. The present invention can decompose and recycle the used absorbent sanitary product through the system. In addition, the system uses several special modules to completely separate the fiber raw materials, so that the raw materials can be regenerated into other usable new products, so as to achieve the effect of effective recycling of waste. The absorbent hygiene product material is very complex. Hence, the present invention is provided with a variety of modules, which can be separated and purified in sequence according to the gravity, density, and material size of the content. Accordingly, the main separation object of this system is fluff fiber. Fluff fiber is a lightweight, low-density and absorbent material. Therefore, the separation and purification of fluff fibers must be carried out according to the abovementioned characteristics. Compared with other materials, the separation of fluff fibers has more steps. Moreover, the system also needs to maintain the intact structure of fluff fibers. Therefore, in the steps (F)—(G) after purifying the secondary fiber material in the separation process, the intervention of huge mechanical force must be avoided. For example, use multiple centrifugation and water replenishment methods instead of one-time shearing force to ensure that high-purity fiber raw material F.

As understood by a person skilled in the art, the foregoing preferred embodiments of the present invention are illustrated of the present invention rather than limiting of the present invention. It is intended to cover various modifications and similar arrangements comprised within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A fiber raw material processing system, comprising:
   a cutting module;
   a bulk pulping module, connected with the cutting module, and the bulk pulping module comprises at least one spoiler, a first rotor and at least two blades;
   a salt slurry processing module, connected with the bulk pulping module;
   a pressure screen, connected with the salt slurry processing module, the pressure screen comprises a second rotor, a first filtration pore and a waste outlet;
   a separation module, connected with the pressure screen;
   an inclined screening module, connected with the separation module, the inclined screening module comprises a slope, a second filtration pore and a liquid outlet;
   an extruder, connected with the inclined screening module; and
   a recycling module, connected with the extruder, the inclined screening module and the bulk pulping module.

2. The fiber raw material processing system as claimed in claim 1, wherein the salt slurry processing module further comprises a buffering tank, a settlement tank, a slurry storage tank or combinations thereof.

3. The fiber raw material processing system as claimed in claim 1, wherein the separation module further comprises a first centrifugal machine, a dilution tank, a second centrifugal machine or combinations thereof.

4. The fiber raw material processing system as claimed in claim 1, wherein the at least one spoiler is spoiling board, configured in the bulk pulping module independently.

5. The fiber raw material processing system as claimed in claim 1, wherein the first rotor is columnar rotor.

6. The fiber raw material processing system as claimed in claim 1, wherein the at least two blades are configured on bottom of the bulk pulping module.

7. The fiber raw material processing system as claimed in claim 1, wherein the first filtration pore is spindle filtration pore, and the second filtration pore is constructed by a plurality of pores with different diameters.

8. An operating method of a fiber raw material processing system, comprising:
   (A) providing the fiber raw material processing system as claimed in claim 1;
   (B) putting an absorptive article into the cutting module for cutting;
   (C) transferring the absorptive article which has been cut to the bulk pulping module, and the bulk pulping module breaks and separates the absorptive article via a centrifugal force breaking separation, remaining an absorptive recycled material;
   (D) transferring the absorptive recycled material to the salt slurry processing module, separating a primary fiber material;
   (E) filtering the primary fiber material with the pressure screen, and the pressure screen filters out a secondary fiber material and an impurity;
   (F) filtering the secondary fiber material with the separation module, and the separation module removes a waste of the secondary fiber material via centrifugal force, producing a fluff fiber raw material precursor;
   (G) the fluff fiber raw material precursor is transferred to the inclined screening module for filtration, remaining a primary fluff fiber raw material product; and
   (H) the primary fluff fiber raw material product is transferred to the extruder for squeezing and dehydrating, forming a fiber raw material.

9. The operating method of a fiber raw material processing system as claimed in claim 8, wherein the bulk pulping module removes a primary plastic via the centrifugal force breaking separation in the step (C).

10. The operating method of a fiber raw material processing system as claimed in claim 8, wherein the bulk pulping module further comprises a first rotor, preventing the round clogging of the absorptive article after the centrifugal force breaking separation in the step (C).

11. The operating method of a fiber raw material processing system as claimed in claim 8, wherein the bulk pulping module further comprises at least one spoiler, and the bulk pulping module rotates to create at least one at least one vortex and undercurrent of liquid in the step (C).

12. The operating method of a fiber raw material processing system as claimed in claim 8, wherein the bulk pulping module further comprises at least two blades, accelerating the centrifugal force breaking separation of the absorptive article in the step (C).

13. The operating method of a fiber raw material processing system as claimed in claim 8, wherein the salt slurry processing module further comprises a settlement tank which is able to settle an absorbent polymer contained in the absorptive recycled material via gravity in step (D).

14. The operating method of a fiber raw material processing system as claimed in claim 8, wherein the salt slurry processing module further comprises a slurry storage tank, the slurry storage tank separates the primary fiber material which moves and follows fluid liquid to the slurry storage tank in the step (D), and proceeds to the step (E).

15. The operating method of a fiber raw material processing system as claimed in claim 8, wherein the primary fiber material is processed by a second rotor, a first filtration pore or combinations thereof which are contained by the pressure screen, remaining the secondary fiber material in the step (E).

16. The operating method of a fiber raw material processing system as claimed in claim 15, wherein the primary fiber material removes the impurity without removing the secondary fiber material via a waste outlet which is further comprised by the pressure screen in the step (E).

17. The operating method of a fiber raw material processing system as claimed in claim 8, wherein the separation module further comprises a first centrifugal machine, a dilution tank, a second centrifugal machine or combinations thereof, making sure that no liquid-absorbing salt remains in the secondary fiber material in step (F).

18. The operating method of a fiber raw material processing system as claimed in claim 8, wherein the separation module is further connected with the salt slurry processing module, and the waste is re-sent back to the salt slurry processing module for removing an absorbent polymer in the step (F).

19. The operating method of a fiber raw material processing system as claimed in claim 8, wherein the fluff fiber raw material precursor is filtered out via a slope and a second filtration pore comprised by the inclined screening module in step (G).

20. The operating method of a fiber raw material processing system as claimed in claim 8, wherein a recycling module recycles liquid from a liquid outlet comprised by the inclined screening module of step (G) and squeezing and dehydrating of the extruder of step (H), the liquid is further transferred back to the bulk pulping module and repeats the steps (C) to (H).

\* \* \* \* \*